United States Patent
Raisanen et al.

(10) Patent No.: US 8,965,281 B2
(45) Date of Patent: Feb. 24, 2015

(54) MOBILE DEVICE WITH NEAR FIELD COMMUNICATION MODULE AND SECURE CHIP

(75) Inventors: Jukka-Pekka Raisanen, Laukaa (FI); Jarkko Sevanto, Vantaa (FI)

(73) Assignee: Nokia Corporation, Espoo (FI)

(*) Notice: Subject to any disclaimer, the term of this patent is extended or adjusted under 35 U.S.C. 154(b) by 2350 days.

(21) Appl. No.: 11/620,544

(22) Filed: Jan. 5, 2007

(65) Prior Publication Data

US 2008/0207124 A1 Aug. 28, 2008

Related U.S. Application Data

(63) Continuation-in-part of application No. 11/398,488, filed on Apr. 5, 2006, now abandoned.

(51) Int. Cl.
| | |
|---|---|
| H04B 7/00 | (2006.01) |
| H04M 1/725 | (2006.01) |
| G06F 21/70 | (2013.01) |
| G06Q 20/20 | (2012.01) |
| G06Q 20/32 | (2012.01) |
| G06Q 20/34 | (2012.01) |
| G06Q 20/40 | (2012.01) |
| H04B 1/38 | (2006.01) |
| H04M 1/00 | (2006.01) |
| H04M 1/665 | (2006.01) |

(52) U.S. Cl.
CPC ............. H04M 1/7253 (2013.01); G06F 21/70 (2013.01); G06Q 20/20 (2013.01); G06Q 20/3278 (2013.01); G06Q 20/352 (2013.01); G06Q 20/40 (2013.01); G06F 2221/2113 (2013.01); H04M 1/665 (2013.01)
USPC .......................... 455/41.2; 455/550.1; 455/558

(58) Field of Classification Search
CPC ............................ H04L 63/0428; G06F 21/83
USPC ........................................... 455/41.2; 726/26
See application file for complete search history.

(56) References Cited

U.S. PATENT DOCUMENTS

| | | | | |
|---|---|---|---|---|
| 6,738,964 | B1 * | 5/2004 | Zink et al. | 717/105 |
| 2001/0052846 | A1 * | 12/2001 | Jespersen | 340/539 |
| 2003/0014643 | A1 * | 1/2003 | Asami et al. | 713/182 |
| 2003/0023554 | A1 * | 1/2003 | Yap et al. | 705/43 |
| 2003/0187787 | A1 * | 10/2003 | Freund | 705/39 |
| 2005/0097038 | A1 | 5/2005 | Yu et al. | |
| 2006/0026205 | A1 * | 2/2006 | Butterfield | 707/104.1 |
| 2007/0095892 | A1 | 5/2007 | Lyons et al. | |
| 2007/0152035 | A1 * | 7/2007 | Adams et al. | 235/380 |
| 2007/0235539 | A1 | 10/2007 | Sevanto et al. | |
| 2008/0161045 | A1 * | 7/2008 | Vuorenmaa | 455/556.1 |

OTHER PUBLICATIONS

Harry Newton, Newton's Telecom Dictionatry, Mar. 2007, Flatitron Publishing, 23rd, p. 854.*

* cited by examiner

*Primary Examiner* — Yuwen Pan
*Assistant Examiner* — Ayodeji Ayotunde
(74) *Attorney, Agent, or Firm* — Alston & Bird LLP

(57) ABSTRACT

A mobile device provided with a secure chip and a short-range wireless RF communication module, which can be used for contactless transactions with external short-range wireless RF communication devices, for example at a point of sales. The mobile device is provided with user selectable activity levels of the secure chip to reduce security risks/concerns associated with such a terminal. The user selectable activity levels may include levels in which the secure chip is deactivated by default, and only temporarily activated upon user confirmation or the entry of a password or PIN.

56 Claims, 5 Drawing Sheets

MOBILE DEVICE WITH NEAR FIELD COMMUNICATION MODULE AND SECURE CHIP

CROSS-REFERENCE TO RELATED APPLICATIONS

This application is a continuation-in-part of, claims the benefit of and priority from U.S. patent application Ser. No. 11/398,488, filed Apr. 5, 2006, now pending.

FIELD

The disclosed embodiments relate to short-range wireless RF communication and secure smart chip technology, and specifically the use of short-range wireless RF communication and secure chips in mobile devices.

BACKGROUND

Short-range wireless RF communication is especially rapidly expanding as a technology labeled Near Field Communication (NFC). NFC is a standards-based, short-range wireless RF connectivity technology that enables simple and safe two-way interactions among electronic devices, allowing consumers to perform contactless transactions, access digital content and connect devices with a single touch. Typically this technology is used in consumer electronics, mobile devices and PCs.

Near Field Communication technology involves contactless identification and interconnection technologies. NFC operates in the 13.56 MHz frequency range, over a typical distance of a few centimeters.

Contactless transaction devices can be used e.g. for local contactless credit card payments or as a contactless transportation/entry ticket. Also, NFC enables users to have easy access to various mobile services by simply touching tags that contain service shortcuts such as URLs or SMS service messages. Furthermore, NFC enables users to easily share content locally simply by bringing two NFC devices close to each other.

Since contactless cards can be read without physical contact between the reader and the card, it is theoretically possible that someone could read other persons card information from a short distance without the other person noticing this. Hence, consumers using contactless cards may be concerned of the possibility of someone reading their card and sensitive information stored in the card(s) for example when traveling in a crowded subway train. Furthermore, e.g. in the U.S. contactless credit cards can be used for payments below 50 USD without any form of identification or authentication. This means that if a consumer would loose his/her contactless card, basically anybody could misuse it easily until the card has been deactivated from the backend systems. Same concerns are raised when a mobile phone is used as device for contactless card transactions.

The current state of the secure chip or of the short-range RF communication module is in known-systems typically dealt with in a dedicated menu in the menu structure. However, when controlling the state of the secure chip or of the short-range RF communication module, the user should know the current state and be informed how a state change can be performed. This information should be available to the user, but known systems are not always able to provide such information when a user needs it It is desirable to have a contactless secure chip device that overcomes or at least reduces the safety risks and other problems and drawbacks set out above. Further, it is desirable to providing the flexibility for the user to decide what security level to use.

SUMMARY

The disclosed embodiments are directed to provide means for a mobile device user to conduct payment/transactions in a near field communication environment and provide the user with means to control and interact with the secure payment/transaction applications, and simultaneously control the exposure of the secure chip.

According to a first aspect of the disclosed embodiments, a secure chip is implemented in a mobile device in which the activity of the secure chip and/or short-range wireless RF communication module is controlled by a processor in the mobile device in accordance with a plurality of user selected activation levels.

In this solution the activity of the secure chip and/or the short-range wireless RF communication module in the mobile device can be controlled by the consumer via mobile device User Interface. Preferably, three levels are defined related to the visibility/activity of the secure chip:

Always Active: the secure chip is active all the time until the user explicitly decides to change the visibility level. The mobile device can be used for contactless card transactions without any user interaction in the phone UI, even in power-off situation (assuming that phone supports contactless transactions in power-off mode).

Activated by Confirmation: by default the secure chip is not active, but when the mobile device is brought close to an external reader, the user is prompted to activate the secure chip. If the user confirms the activation, the secure chip is activated and the user needs to touch the external reader again for completing the transaction. Once the transaction is completed and the user takes the phone away from the external reader's RFID field, or after a predefined timeout, the secure smart chip is automatically inactivated. The inactivation could also be triggered by a combination of timeout and/or number of transactions.

Activated With Password or PIN: similar to the 'Activated by confirmation', but instead of a simple confirmation, the user needs to provide a correct activation password in order to activate the secure smart chip.

Thus, the users can determine the desired security level via the user interface. Users using the device mainly for payment are likely using either 'By confirmation' or 'With password', but users who are using the device only pay for public transportation or similar services that not so prone to misuse, most likely simply want to access their bus/metro as easily as possible and therefore select the 'Always active'.

Preferably, the user interface (UI) in the mobile device provides means for the user to change the activation level.

The device can be provided with an indicator in the UI showing the current activation level of the secure chip level to the user.

The secure chip and the short-range wireless RF communication module can be used for carrying out transactions, and the transaction can be completed when the user brings the mobile device in the proximity of the external short-range wireless RF communication device after activation of the secure smart chip. Preferably, the processor deactivates the secure chip in the at least one user selectable activation level when a predetermined or user selected number of transactions has been completed and/or when the mobile device is no longer in the proximity of the external short-range wireless RF communication device. The processor may also deactivate the secure smart chip in the at least one user selectable activation level after a predetermined or user selected timeout following the activation of the secure smart chip.

The output means of the mobile device may comprise light emitting indications and/or a display and/or a speaker, and the input means may include keys and/or slides and/or rotators and/or a microphone and/or a touch screen. The input means and the output means in interaction with the processor form the core of the user interface of the mobile device.

Preferably, the processor is configured to indicate the current user selected activation level for the secure chip via the output means, so that the user can at all times be aware of the activation level of the secure smart chip.

The mobile device may be of the type that supports activity of the short-range wireless RF communication module and the secure smart chip when the mobile device is powered-off.

The plurality of user selectable activation levels may include a level in which the processor keeps the secure chip active until the user decides to change the use selectable activation level for the activation of the secure chip.

According to another aspect there is provided a method for controlling the activation of a secure chip in a mobile device that is provided with a user interface, a secure chip and a short-range wireless RF communication module comprising: keeping the secure chip inactive as default; detecting the presence of an external short-range wireless RF communication device in the proximity of the mobile device, and prompting the user via the user interface to allow the secure chip to be temporary activated upon detecting an external short-range wireless RF communication device in the proximity of the mobile device.

By using the method of the disclosed embodiments, inadverted transactions via the secure chip are avoided or at least the risk thereof is significantly reduced.

According to another aspect, a mobile device is provided in which the state of activation of a secure chip and/or of a short-range RF communication module is indicated on the idle display.

Further aspects of the claimed invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the mobile device and the method for controlling the activation of a secure chip in a mobile device according to the invention in the form of a mobile terminal, preferably a mobile communication terminal in the form of a cellular/mobile phone, will be described by the preferred embodiments. The invention can, however, also be carried out with any other mobile computer terminal such as a Personal Digital Assistant (PDA).

Figure 1:
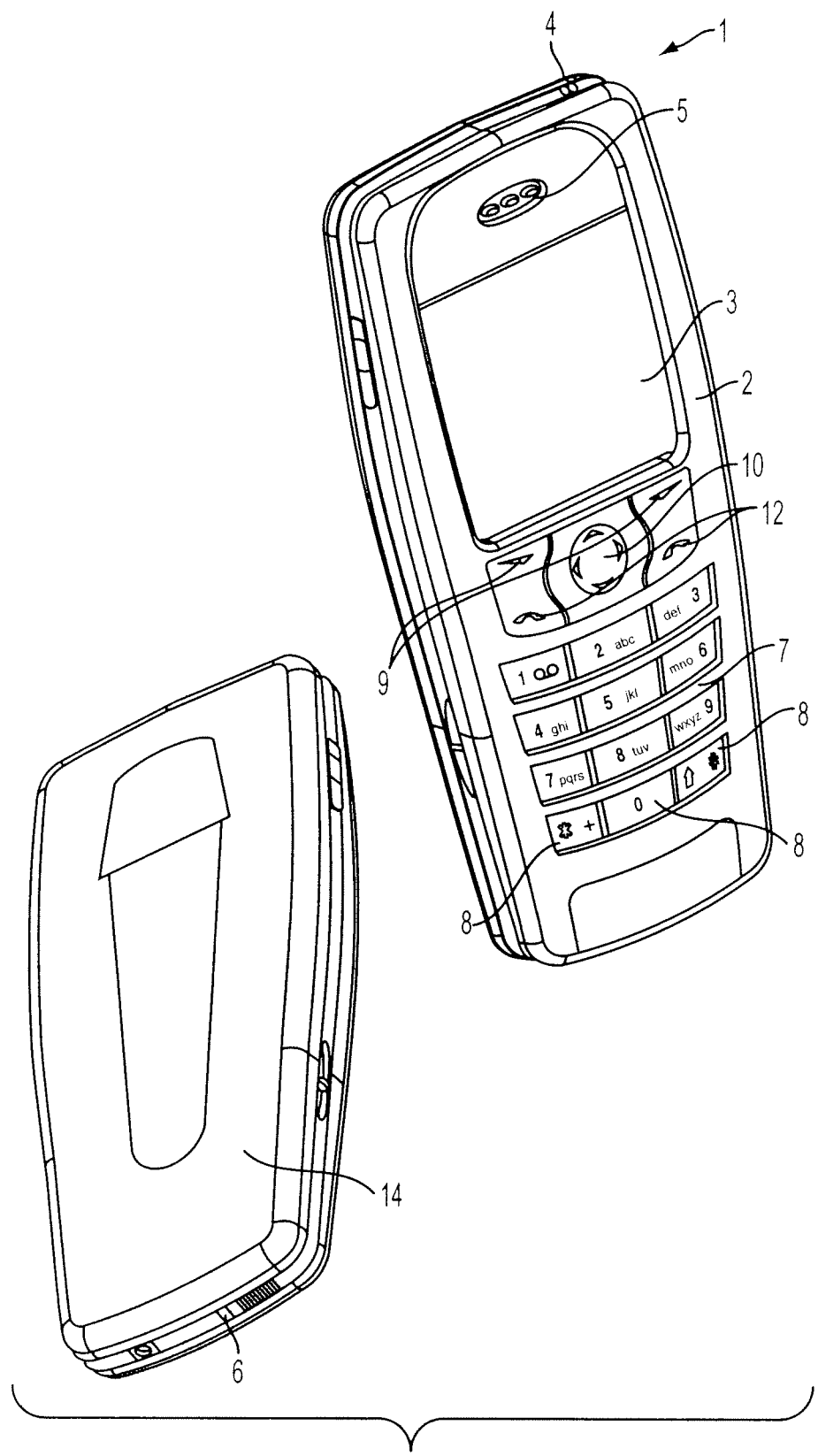
FIG. 1 shows perspective front and rear view of a mobile terminal according to an embodiment of the claimed invention.

FIG. 1 illustrates an embodiment of a mobile terminal according to the invention in the form of a mobile telephone by front and rear perspective views. The mobile phone 1 comprises a user interface having a housing 2, a display 3, an on/off button 4, a speaker 5 (only the openings are shown), and a microphone 6 (only the opening is shown). The phone 1 according to the preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad has a first group 7 of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 2 has additionally a second group of keys comprising two softkeys 9, two call handling keys 12, and a 5-way navigation key 10 (up, down, left, right and center: select/activate). The function of the softkeys depends on the state of the phone, and navigation in the menu is performed by using the navigation-key. The present function of the softkeys 9 is shown in separate fields (soft labels) in the display 3, just above keys 9. The two call handling keys 12 are used for establishing a call or a conference call, terminating a call or rejecting an incoming call. This key layout is characteristic for e.g. the Nokia 6610™ phone.

The arrow key 10 is a four- or five-way key which can be used for cursor movement, scrolling and selecting (five-way key) and is placed centrally on the front surface of the phone between the display 3 and the group of alphanumeric keys 7. A releasable rear cover 14 gives access to the SIM card 16 (not visible in FIG. 1), and the battery pack (not visible in FIG. 1) in the back of the phone supplies electrical power for the electronic components of the mobile phone.

The mobile phone 1 has a flat display 3 that is typically made of an LCD with optional back lighting, such as a TFT matrix capable of displaying color images. A touch screen may be used instead of a conventional LCD display.

Figure 2:
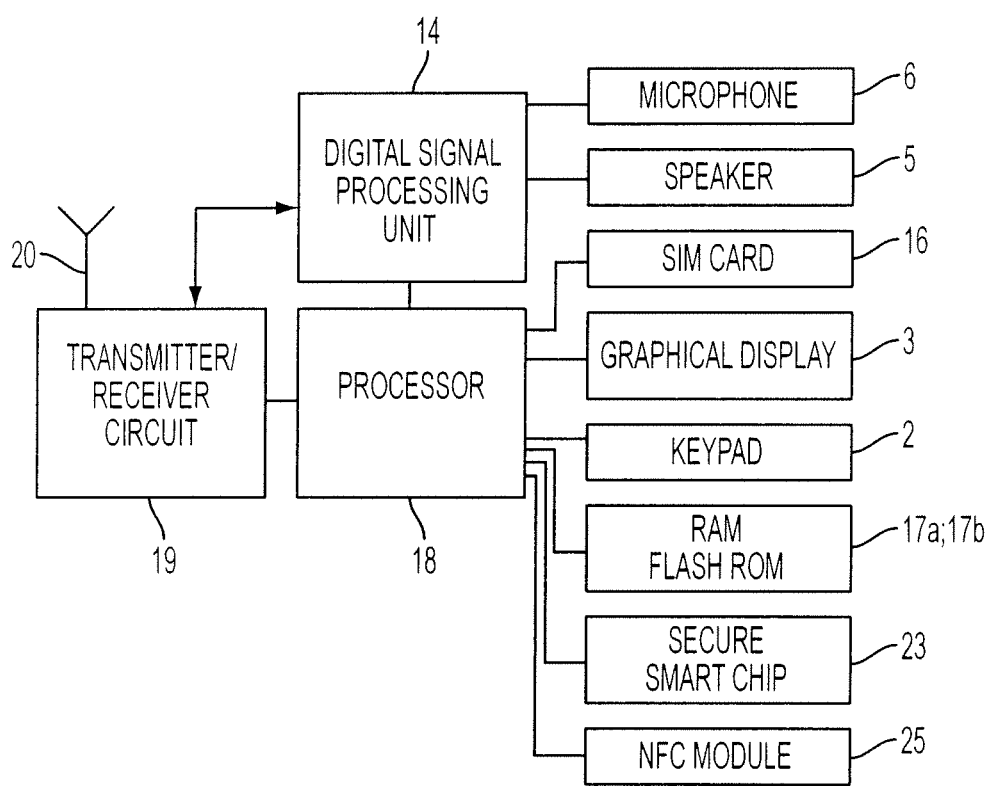
FIG. 2 is a block diagram illustrating the general architecture of a mobile terminal illustrated in FIG. 1.

FIG. 2 illustrates in block diagram form the general architecture of a mobile phone 1 constructed in accordance with the present invention. A processor 18 controls the communication with the cellular network via the transmitter/receiver circuit 19 and an internal antenna 20. A microphone 6 transforms the user's speech into analogue signals, the analogue signals formed thereby are A/D converted in an A/D converter (not shown) before the speech is encoded in a digital signal processing unit 14 (DSP). The encoded speech signal is transferred to the processor 18, which e.g. supports the GSM terminal software. The processor 18 also forms the interface to the peripheral units of the apparatus, including a RAM memory 17a and a Flash ROM memory 17b, a SIM card 16, the graphical display 3, the secure chip 23, the NFC module 25, and keypad 2 (as well as data, power supply, etc.). The digital signal-processing unit 14 speech-decodes the signal, which is transferred from the processor 18 to the speaker 5 via a D/A converter (not shown). It is understood that the NFC module 25 does not need to be any a short-range wireless RF communication module that falls under the NFC standards, the invention could also be realized with any other type of short-range wireless RF communication module.

The NFC module 25 which is in the field also referred to as "Contactless Card" includes means for contactless communication over a very short range (typically a few centimeters). The NFC module can include an RF transceiver and can be operated with RFID technology, but can also be based on an optical communication using an IR transceiver.

The secure chip 23 is in the field also referred to as "smart card" or "secure smart chip" and can be activated and deactivated by the processor 18, for example by switching power to the secure chip on and off. Alternatively, (not shown) the secure chip 23 is connected via a switch to the NFC module 25.

The secure chip 23 may contain one or more credit card identifiers, similar payment card identifiers or electronic tickets. The secure chip could be issued by various types of service providers or the like, such as retail houses, employers, amusement parks, banks, credit card companies, mobile phone network operators, etc. Several entities can have their software installed on one secure chip 23. Thus, one secure chip 23 may hold a variety of different client data, relating to e.g. credit cards, retail store customer loyalty programs, parking house login, etc.

Every issued credit card equivalent in the secure chip 23 may have an identifier like credit number to be identified when used in the transaction. The identifier can be changed between mobile device and the transaction device (the external short range RF communication device). The user can be asked a password or PIN based on the credit card used in the transaction. Thus different passwords based on the different used credit card may be needed.

In another embodiment the credit cards can be bundled so that only one user PIN or password is required. Alternatively, the user may only have access to his/her credit cards and then in order to access the credit cards then another PIN or password is needed. In this case user will inform the PIN he/she is using to the credit card company so that the system may justify that the used PIN is right one. The credit cards may be visible as an icon on the display 3 to reveal which credit cards are available and in which status they exist e.g. they might inform the user the expire date, the number of card, etc. The display of the expiry date can be automatic or based on predefined criteria e.g. one month before expiry to inform user through a calendar event or message that now is time for renewal of the credit card. The icons can change color to indicate the status or status change of the various credit or loyalty cards e.g. to black and white that is disabled because of fraud or the like. Further in one preferred embodiment of the invention the icon can represent the logo of the credit card company and in that way represent the user the credit card company. Further, user may able to change his/her credit card logo by replacing e.g. the digital image as an icon for the credit card. Preferably, the icon other information like name of the card can be shown on the image so that user can easily identify which credit card is concerned through the display.

This same relates to loyalty cards in digitized form where an external near field communication device may reveal that which loyalty card is to be used and this ID is communicated between devices. Thus the mobile device may give information about the status or the loyalty point information in the contact with the external near field communication device if e.g. user touches (or gets very close to) the external near field communication device the third time.

Further embodiments may relate that the information of id with status is exchanged already in the second time touch.

When the NFC module 25 is in very short range from an external NFC device (not shown), such as a NFC terminal/reader at a point of sale, and when the secure chip 23 is active a transaction such as a payment can be carried out. Example: [credit card number (12345678990000), credit card valid information (until 09/07), member since (99), possible other codes (xx vv)] can be interpreted so that at least the credit card identifier like the number is transferred. Furthermore, the number can be associated with one or more loyalty card numbers to be transferred respectively. Loyalty card points can be used when buying if the user accepts the request from the near field external device like the credit card payment.

The software of mobile terminal 1 is configured to let the processor 18 control the activation and deactivation of the secure chip 23 in accordance with a plurality of user selectable activation levels. The user can change the activation levels via the User Interface of the mobile terminal 1.

The user selectable levels for the activation and deactivation of the secure chip 23 include according to a preferred embodiment an "Always on" level, a "By confirmation" level and a "With password" level. In the "By confirmation" level and in the "With password" level the processor 18 keeps the secure chip 23 inactive by default.

Figure 3:
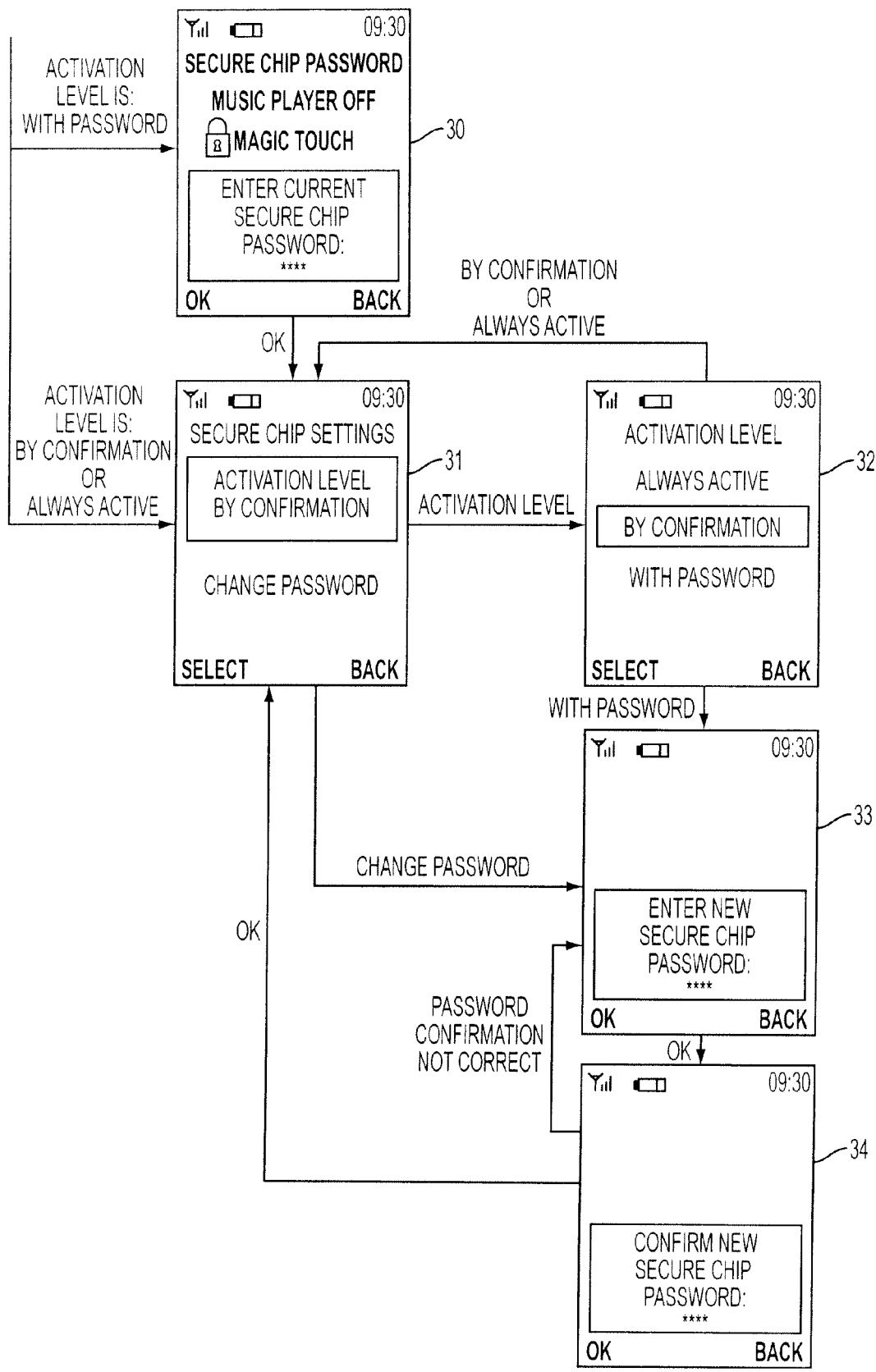
FIG. 3 is a flow chart illustrating a first aspect of the operation of the mobile terminal of FIG. 1 with the help of screenshots.

FIG. 3 shows an embodiment of the procedure for selecting/changing the secure chip activation level via the user interface in the form of a flow chart including screenshots.

The menu structure of the mobile terminal includes a menu item "Secure chip settings". The menu structure is accessed from the idle mode of the mobile terminal via the left Soft Key 9 "Menu". The user can access the menu point "Secure chip settings" in a well known manner via the user interface, e.g. point by using the navigation key 10 in combination with the softkeys 9.

When the user accesses the menu item "Secure chip settings" the password is asked in step/screenshot 30 from the user before changing the activation level setting if the activation level has been earlier set to be 'By password', and then the process moves to step/screenshot 31. If the earlier setting was not "By password", the user enters the "Secure chip settings" menu item at step/screenshot 31.

In step/screenshot 31 the user has the possibility to select the menu item "Activation level" (this menu item also indicates the presently active level for the activation of the secure chip 23). If the user presses the left softkey 9 "Select" when the "Activation level" menu item is highlighted, as shown in FIG. 3, the process moves to step/screenshot 32 in which the user has the possibility to select from three different activation levels: "Always active", "By confirmation" and "With password". The user can highlight the desired activation level by using the navigation key 10 and select/activate the highlighted activation level by pressing the left softkey 9 "Select". If the user has in step/screenshot 32 selected activation level "By confirmation" or "Always active" the process moves back to step/screenshot 31. The user can exit from the step/screenshots 31 by pressing the right to softkey 9 "Back". If the user selects the activation level "with password" in step/screenshot 32, the process moves to the step/screenshot 33 in which the user is prompted to enter a new secure chip password by displaying a corresponding message on the display 3. When the user has entered a password by using the alphanumerical keys 8, the process moves on to step/screenshots 34 in which the user is prompted to confirm the new password by displaying a corresponding message on the display 3. When the user has confirmed the new secure chip password correctly, the process moves back to step/screenshot 31. If the user does not correctly confirm the new secure chip password the process moves back to step/screenshots 33 to give the user a new opportunity to define a new secure chip password.

When the user in step 31 selects the menu item "change password", the process moves to step/screenshot 33, and the process of defining a new secure chip password as described above will take place.

Figure 4:
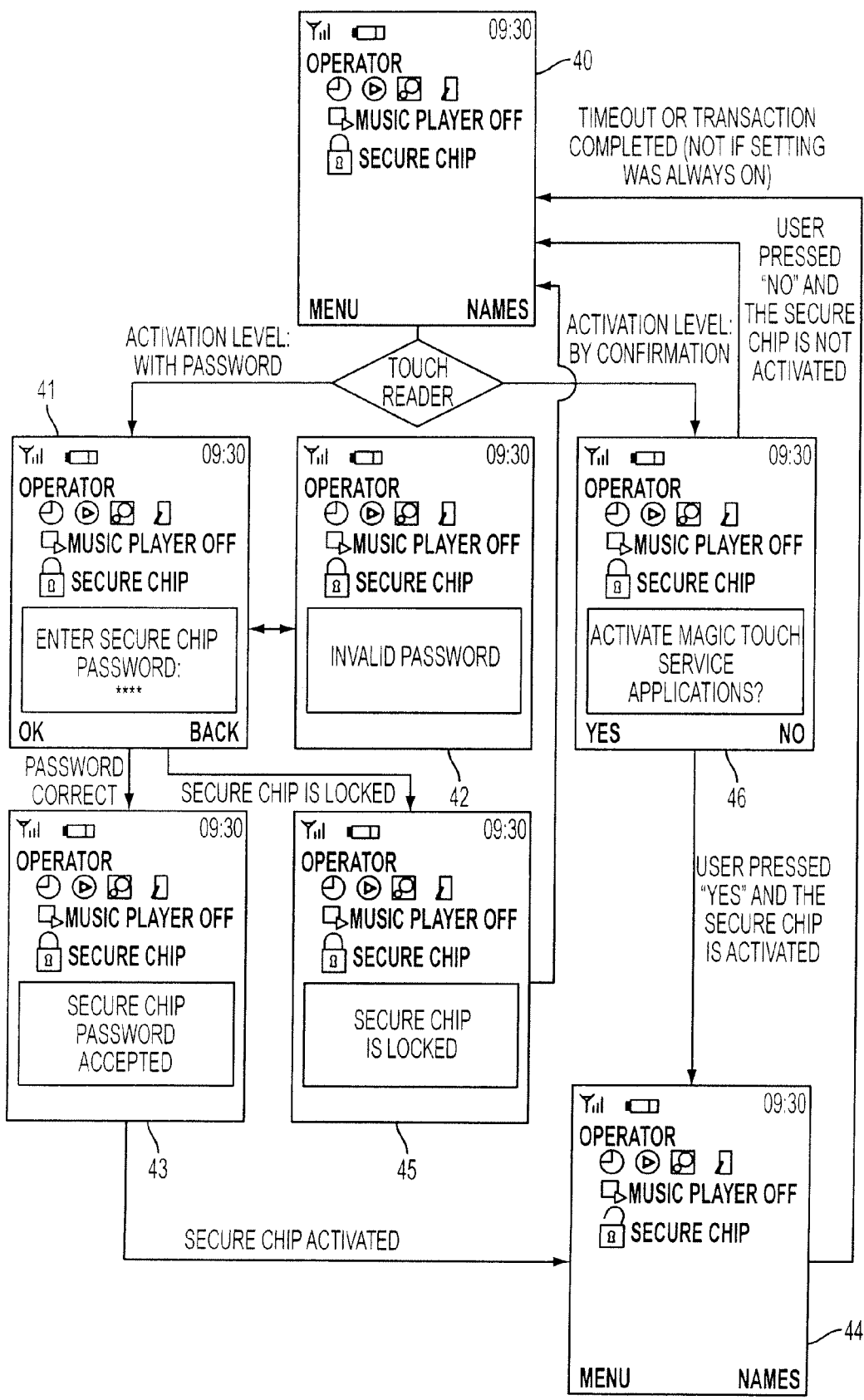
FIG. 4 is a flow chart illustrating a first aspect of the operation of the mobile terminal of FIG. 1 with the help of screenshots.

FIG. 4 shows a preferred embodiment of the user interface when performing contactless transactions with different activation levels for the secure chip 23. FIG. 4 illustrates the process by means of a flow chart including screenshots of the display 3.

The first step of the process is shown by display 40. This is the idle mode of the mobile phone 1 in which the display 3 shows common information available at display of a mobile terminal, such as items relating to the music player, battery status, antenna status, a clock and at the bottom of the display 3 the labels for the softkeys 9.

Further, the display 3 shows the status of the secure chip 23. The display 3 shows by means of an icon representing a closed padlock adjacent the text "Secure chip" that the secure chip 23 is presently deactivated. The text "Secure chip" may be followed by the text "Activated with password" to indicate to the user that a password entry is required for activation of the secure chip 23, or followed by the text "Activated by confirmation" to indicate to the user that a simple confirmation is sufficient for activation of the secure chip 23.

When the mobile terminal 1 is brought into proximity of an external near field communication device (indicated by the "Touch reader" in FIG. 4) the near field communication module 25 detects the proximity of an external near field communication device and the process moves to step/screenshot 41 when the activation level "With password" was selected.

In step/screenshot 41 the user is prompted to enter the secure chip password by a corresponding prompt request on display 3. When the user enters an incorrect password, the process moves to step/screenshot 42 in which the display indicates the fact that an incorrect password has been entered, whereafter the process moves back to step/screenshot 41 to offer the user another opportunity to enter the secure chip password. If the number of times an incorrect password is entered exceeds a predetermined threshold, the secure chip 23 is locked, and the process moves to step/screenshot 45 in which the display 3 shows a message to inform the user that the secure chip is locked. The secure chip 23 can then only be unlocked by using a special and longer keyword that can for example be provided by the credit card company that has issued the secure chip.

When the user has entered the correct password the process moves on to step/screenshot 43 in which the display 3 shows a message that the secure chip password has been accepted. Thereafter, the processor 18 temporarily activates the secure chip 23 and the process moves to step/screenshot 44 in which the display 3 shows an icon representing an open padlock adjacent to the text "Secure chip". When the terminal in the state of step/screenshot 44 is kept or brought again into proximity of the external near field communication device, a transaction as described above is carried out.

After a timeout or after completing a predetermined (possibly user selected) number of transactions, the process moves from step/screenshot 44 back to step/screenshot 42 and the mobile terminal returns to the idle mode with the secure chip 23 switched off (deactivated) if the secure chip activation level was "With password" or "By confirmation". The secure chip 23 may according to a variation of the embodiment also be deactivated by the processor 18 when the mobile terminal 1 is moved out of proximity of the external near field communication device after a transaction has been completed.

When the mobile terminal 1 is brought into proximity of an external near field communications device when the activation level is "By confirmation", the process moves from step/screenshot 42 to step/screenshot 46 and the display shows a prompt to confirm the activation of the secure chip 23 by pressing a single key, in this case the left softkey 9 labeled "Yes" or to reject the activation of the secure chip 23 by pressing the right softkey 9 labeled "No". If the user confirms the activation of the secure chip 23, the process moves to step/screenshot 44, and if the user rejects the activation of the secure chip 23 the process moves back to step/screenshot 40.

According to an embodiment of the invention (not shown), the part of the UI which is shown on the display 3 of the mobile device 1 may also shown simultaneously on a display of an external short range RF device such as a point of sale (POS) terminal.

If the secure chip activation level is "Always on", the display 3 will in the idle mode of the mobile terminal 1 correspond to step/screenshot 44, and there will be no interaction required by the user in the user interface of the mobile terminal 1 when the terminal is brought in the proximity of external near field communication device. Of course, the fact that a transaction has been carried out, and details concerning the transaction may be indicated to the user via the output means of the user interface.

Figure 5:
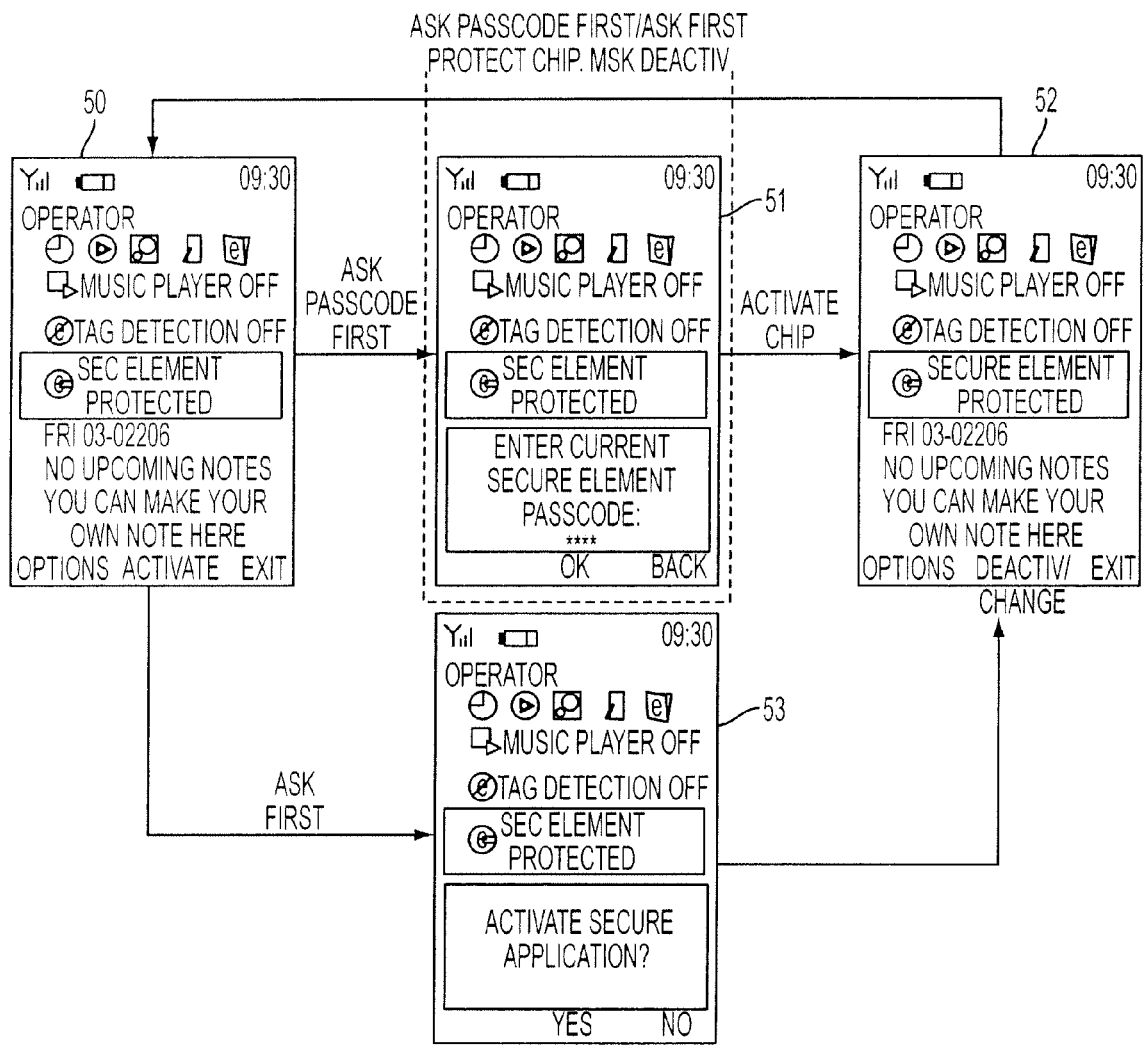
FIG. 5 is a flow chart illustrating another embodiment of the operation of the mobile terminal of FIG. 1.

FIG. 5 illustrates another embodiment by means of screenshots that are linked to form a flowchart. In this embodiment, the status of activation of the short-range wireless RF communication module 25 and the status of activation of the secure chip 23 are shown in the idle display of the mobile device 1. The idle display is the display shown on the display screen 3 when there are no other user interface display activities. In an embodiment, the idle mode display is associated with the idle mode of the mobile device 1. For user interface activities that only partially occupy the display screen 3, the idle mode display can form the background and can still partially be seen by the user.

The idle display shows the softkey labels, and a plurality of elements including several icons representing shortcuts to applications (clock, music player, calendar, gallery, etc.). Further, the idle display according to the present embodiment shows an indication of the status of activation of the short-range wireless RF communication module 25 and an indication of the status of activation of the secure chip 23. In screenshot 50, the status of the short-range wireless RF communication module is indicated by for example the text "Tag detection off" in combination with a graphic icon. The status of the secure chip is indicated by for example the text "Sec. Element protected" in combination with a graphic icon. These text labels are changed in accordance with the actual status of the short-range wireless RF communication module 25 and of the secure chip 23, respectively.

The user can selectively highlight one of the elements on the idle display by using the navigation plus select key 10. In screenshot 50, the status indication of the secure chip has been highlighted. When the indication of the status of activation for the wireless RF communication module or the indication of the status of activation of the secure chip is highlighted, the soft label associated with the navigation plus select key 10 is changed by the processor 18 to a function that is related to changing the activation status of the wireless RF communication module 25 or of the secure chip 23, depending on which one of the two indications has been highlighted.

In screenshot 50 the indication of activation of the secure chip has been highlighted and since the secure chip was protected (inactive), the label associated with the navigation plus select the 10 is for example "Activate" and the right softkey label has been changed to "Back". It is noted that while certain exemplary labels are described herein, in alternate embodiments, any suitable label or descriptor can be used that conveys the intended function or meaning. By pressing the navigation plus select key 10 the user activates the secure chip 23. If the wireless RF communication module activation indication had been highlighted, the central softkey label would also have read "Activate" since the wireless RF communication module 25 was off. When the settings for the activation of the secure chip are "Ask passcode first", the process moves—after the user has pressed the navigation plus select key 10—to step/screenshot 51 in which the user is prompted to enter the secure chip passcode by displaying a corresponding dialog box on the display 3. If the user enters the correct passcode, the process moves on to step/screenshot 52. If the user does not enter the correct passcode the process is repeated, and after a predetermined number of erroneous passcode entries, access to the secure chip is barred (not shown), and can only be reactivated by an operator or by entering a special security code.

When the settings for the activation of the secure chip 23 are "Ask first", the process moves to step/screenshot 53 after the user has pressed the navigation plus select key 10 in the state of screenshot 50 (the same applies to the short range RF communication module 25). In step/screenshot 53 the user is prompted to confirm the activation of the secure chip 23 by displaying a corresponding message on the display screen. Simultaneously, the central softkey label has changed to "Yes" while the right softkey label has changed to "No". When the user presses in the navigation plus select key 10 the process moves on to step/screenshots 52, and the secure chip 23 is activated.

Thus, in this embodiment the status of the secure chip 23 and of the short range RF communication module 25 are always visible to the user in the idle mode. Further, the activation status of the secure chip 23 and of the short-range RF communication module 25 can be changed without leaving the idle display.

With the user selectable activation levels of the disclosed embodiments as described above it is possible for users to select the activity level of the secure chip in accordance with their needs and preferences, while the operation of transactions by means of a near field communication remains user-friendly and intuitive.

The aspects of the disclosed embodiments can be carried out by software, hardware and combinations thereof. The methods described above can be implemented by software running on a processor in the mobile device. In this regard, a computer program product may include program code stored on a computer readable medium or downloadable from a server for carrying out the methods described above, when the computer program product is run on a mobile device.

The claimed invention has numerous advantages. Different embodiments or implementations may yield one or more of the following advantages. It should be noted that this is not an exhaustive list and there may be other advantages which are not described herein. One advantage is allowing for a clear and easy way of visualizing secure element specific controls and states. Another advantage is providing for an easy state change within the idle display. Yet another advantage is that the effect of a change in status can be seen on the display screen immediately after it has been performed.

The input means (of the user interface) for the mobile terminal are not limited to the keypad shown in the preferred embodiments. Instead, keys or buttons not being part of a pad, slides or rotators, a touch screen or speech input via the microphone can be used. The output means (of the user interface) are also not limited to the display shown in the preferred embodiments. Instead, light emitting indicators, such as LEDs, a vibrator or acoustical messages such as tones or spoken messages can be used.

The user interface may also include a fingerprint reader (not shown) that could be used instead to the password secured activation of the secure chip.

The term "comprising" as used in the claims does not exclude other elements or steps. The term "a" or "an" as used in the claims does not exclude a plurality. The single processor or other unit may fulfill the functions of several means recited in the claims.

Although the disclosed embodiments have been described in detail for purpose of illustration, it is understood that such detail is solely for that purpose, and variations can be made therein by those skilled in the art without departing from the scope of the claimed invention.

The invention claimed is:

1. A mobile device comprising:
a user interface comprising an output device and an input device;
a short-range wireless RF communication module for wireless communication with an external communication device when said mobile device is brought in proximity of said external communication device;
a secure chip; and
a processor controlling the operation of said mobile device including the activation and deactivation of said secure chip;
said processor being configured to activate or deactivate said secure chip in accordance with a plurality of activation levels, wherein said activation levels comprise at least one activation level in which the processor prompts a user to confirm activation of said secure chip, wherein a confirmation input by the user via said input device is a non-password confirmation, and wherein the processor activates the secure chip in said activation level upon the confirmation input by the user via said input device.

2. A mobile device according to claim 1, wherein said activation levels include at least one activation level in which said processor keeps the secure chip inactive by default.

3. A mobile device according to claim 2, wherein the processor prompts the user to allow activation of said secure chip upon said short-range wireless RF communication module detecting a proximate external communication device in said at least one said activation level.

4. A mobile device according to claim 3, wherein said processor activates the secure chip in said at least one activation level upon the entry of a password by the user via said input device.

5. A mobile device according to claim 3, wherein said processor activates the secure chip in said at least one activation level upon confirmation by the user via said input device.

6. A mobile device according to claim 3, wherein said secure chip and said short-range wireless RF communication module are used for carrying out a transaction, and said transaction is completed when the user brings the mobile device again into the proximity of said external communication device.

7. A mobile device according to claim 3, wherein said secure chip and said short-range wireless RF communication module are used for carrying out transactions, and said processor deactivates said secure chip in said at least one activation level when a predetermined or user selected number of transactions has been completed or when the mobile device is no longer in the proximity of said external communication device.

8. A mobile device according to claim 3, wherein said processor deactivates said secure chip in said at least one activation level after a predetermined or user selected timeout following the activation of the secure chip.

9. A mobile device according to claim 3, wherein said output device comprises light emitting indications or a display or a speaker or a vibrator, and wherein said input device includes keys or slides or rotators or a microphone or a touch screen.

10. A mobile device according to claim 1, wherein the input device and the output device in interactiion with the processor form a user interface, and wherein the processor is configured to enable the user to change said activation levels via the user interface.

11. A mobile device according to claim 1, wherein said processor is configured to indicate the current activation level for the activation of the secure chip via said output device.

12. A mobile device according to claim 1, wherein said short-range wireless RF communication module and said secure chip can be active when the mobile device is powered-off.

13. A mobile device according to claim 1, wherein said plurality of activation levels include a level in which said processor keeps said secure chip active until the user decides to change the activation level for the activation of the secure chip.

14. A method for controlling activation of a secure chip in a mobile device that is provided with a user interface, a secure chip and a short-range wireless RF communication module comprising:
keeping said secure chip inactive as default;
detecting a presence of an external communication device in a proximity of the mobile device;
prompting the user via the user interface to allow the secure chip to be activated upon detecting the external communication device in the proximity of the mobile device, wherein the user is prompted to confirm the activation prompt for allowing the activation of said secure chip, and wherein the confirmation input by the user via said user interface is a simple confirmation; and activating the secure chip upon the confirmation input by the user via said user interface.

15. A method according to claim 14, wherein the user is required to enter a password for allowing the activation of said secure chip.

16. A method according to claim 14, wherein the confirmation input is a single-key press received through the user interface.

17. A method according to claim 14, further comprising carrying out a transaction through the secure chip and said short-range wireless RF communication module when the secure chip has been activated and the mobile device is in the proximity of said external communication device.

18. A method according to claim 17, further comprising deactivating said secure chip when a predetermined or user selected number of transactions has been completed or when the mobile device is moved out of the proximity of said external communication device after a transaction has been completed.

19. A method according to claim 14, wherein said processor deactivates said secure chip after a timeout with a predetermined or user selected length following the activation of the secure chip.

20. A method according to claim 14, wherein said user interface comprises light emitting indications or a display or a speaker, or keys or slides or rotators or a microphone or a touch screen.

21. A method according to claim 14, further comprising enabling the user to change an activation level of the secure chip via the user interface.

22. A method according to claim 14, further comprising indicating a current activation state of the secure chip via said user interface.

23. A method according to claim 14, wherein the operation of the mobile device and the activation and deactivation of said secure chip is performed by a processor in said mobile device.

24. A method according to claim 14, wherein said processor is configured to activate or deactivate said secure chip in accordance with a plurality of activation levels.

25. A computer program product comprising program code stored on a non-transitory computer readable medium or downloadable from a server for carrying out the method of claim 14, when said computer program product is run on the mobile device.

26. A mobile device comprising:
a user interface with an input device and an output device;
a short-range wireless RF communication module for wireless communication with an external communication device when said mobile device is brought in proximity of said external communication device;
a secure chip;
a processor controlling the operation of the mobile device including activation and deactivation of said secure chip; and
a display screen operatively coupled to said processor;
said processor being configured to show an idle display on said display screen when there are no other user interface display activities; and
said processor being configured to show an activation level indication of said short-range wireless RF communication module or said secure chip in said idle mode display.

27. A mobile device according to claim 26, further comprising a navigation device or selection device and wherein said processor is configured to allow the user to highlight the activation level indication of the short-range wireless RF communication module or the activation level of said secure chip via said navigation device or said selection device.

28. A mobile device according to claim 27, wherein said mobile device includes at least one softkey and wherein said processor is configured to change the label of said at least one softkey to a function relating to the marked activation level indication when a user highlights an activation level indication.

29. A mobile device according to claim 28, wherein said function is changing the activation level concerned.

30. A mobile device according to claim 29, wherein said function is changing the activation level concerned to an active level.

31. A mobile device according to claim 30, wherein said processor is configured to prompt for a password or for a confirmation before changing the activation level of said short-range wireless RF communication module or said secure chip.

32. A mobile device according to claim 29, wherein said processor is configured to perform the change of activation level while displaying said idle mode display.

33. A mobile device according to claim 26, wherein said activation level or levels are indicated by graphical icons.

34. A mobile device according to claim 26, wherein said activation level or levels are indicated by text.

35. A method for operating a mobile device that is provided with a user interface including a display screen, a secure chip and a short-range wireless RF communication module comprising:
  displaying an idle mode display when there are no other user interface display activities; and
  displaying an activation level indication of said secure chip or of said short-range wireless RF communication module in said idle mode display.

36. A method according to claim 35, further comprising allowing a user to highlight the activation level indication of the short-range wireless RF communication module or the activation level said secure chip via a navigation device or a selection device of said mobile device.

37. A method according to claim 36, further comprising changing the function of a softkey of said mobile device to a function relating to the marked activation level indication when a user highlights an activation level indication.

38. A computer program product comprising program code stored on a non-transitory computer readable medium or downloadable from a server for carrying out the method of claim 35, when said computer program product is run on the mobile device.

39. A mobile device according to claim 1, wherein said short-range wireless RF communication module comprises a near field communication (NFC) module for near field communication with an external communication device when said mobile device is brought in proximity of said external communication device.

40. A method according to claim 14, wherein said short-range wireless RF communication module comprises a near field communication (NFC) module for near field communication with an external communication device when said mobile device is brought in proximity of said external communication device.

41. A mobile device according to claim 26, wherein said short-range wireless RF communication module comprises a near field communication (NFC) module for near field communication with an external communication device when said mobile device is brought in proximity of said external communication device.

42. A method according to claim 35, wherein said short-range wireless RF communication module comprises a near field communication (NFC) module for near field communication with an external communication device when said mobile device is brought in proximity of said external communication device.

43. A mobile device according to claim 1, wherein said input device comprises a fingerprint reader and said confirmation is received via the fingerprint reader.

44. A method according to claim 14, wherein said confirmation input is received via a fingerprint reader.

45. A mobile device according to claim 1, wherein said secure chip is configured to be activated via the user interface to an activation level that is one of always active, activated by confirmation, or activated with a password or PIN.

46. A method according to claim 14, wherein said secure chip is configured to be activated via a user interface to an activation level that is one of always active, activated by confirmation, or activated with a password or PIN.

47. A mobile device according to claim 26, wherein said secure chip is configured to be activated via a user interface to an activation level that is one of always active, activated by confirmation, or activated with a password or PIN.

48. A method according to claim 35, wherein said secure chip is configured to be activated via a user interface to an activation level that is one of always active, activated by confirmation, or activated with a password or PIN.

49. A mobile device according to claim 1, wherein said secure chip is automatically inactivated after being activated by confirmation.

50. A method according to claim 14, wherein said secure chip is automatically inactivated after being activated by confirmation.

51. A mobile device according to claim 26, wherein said secure chip is automatically inactivated after being activated by confirmation.

52. A method according to claim 35, wherein said idle secure chip is automatically inactivated after being activated by confirmation.

53. A mobile device according to claim 1, wherein said secure chip is automatically inactivated after a predefined timeout or a number of transactions.

54. A method according to claim 14, wherein said secure chip is automatically inactivated after a predefined timeout or a number of transactions.

55. A mobile device according to claim 26, wherein said secure chip is automatically inactivated after a predefined timeout or a number of transactions.

56. A method according to claim 35, wherein an idle mode is automatically triggered after a predefined timeout or a number of transactions.

* * * * *

UNITED STATES PATENT AND TRADEMARK OFFICE
CERTIFICATE OF CORRECTION

| | | |
|---|---|---|
| PATENT NO. | : 8,965,281 B2 | Page 1 of 1 |
| APPLICATION NO. | : 11/620544 | |
| DATED | : February 24, 2015 | |
| INVENTOR(S) | : Raisanen et al. | |

It is certified that error appears in the above-identified patent and that said Letters Patent is hereby corrected as shown below:

In the Claims

Column 11,
Line 19, "interactiion" should read --interaction--.

Signed and Sealed this
Twenty-fourth Day of November, 2015

Michelle K. Lee
*Director of the United States Patent and Trademark Office*